May 8, 1962 — W. H. COWLES ET AL — 3,033,277
FUEL SUPPLY SYSTEM
Filed May 9, 1955
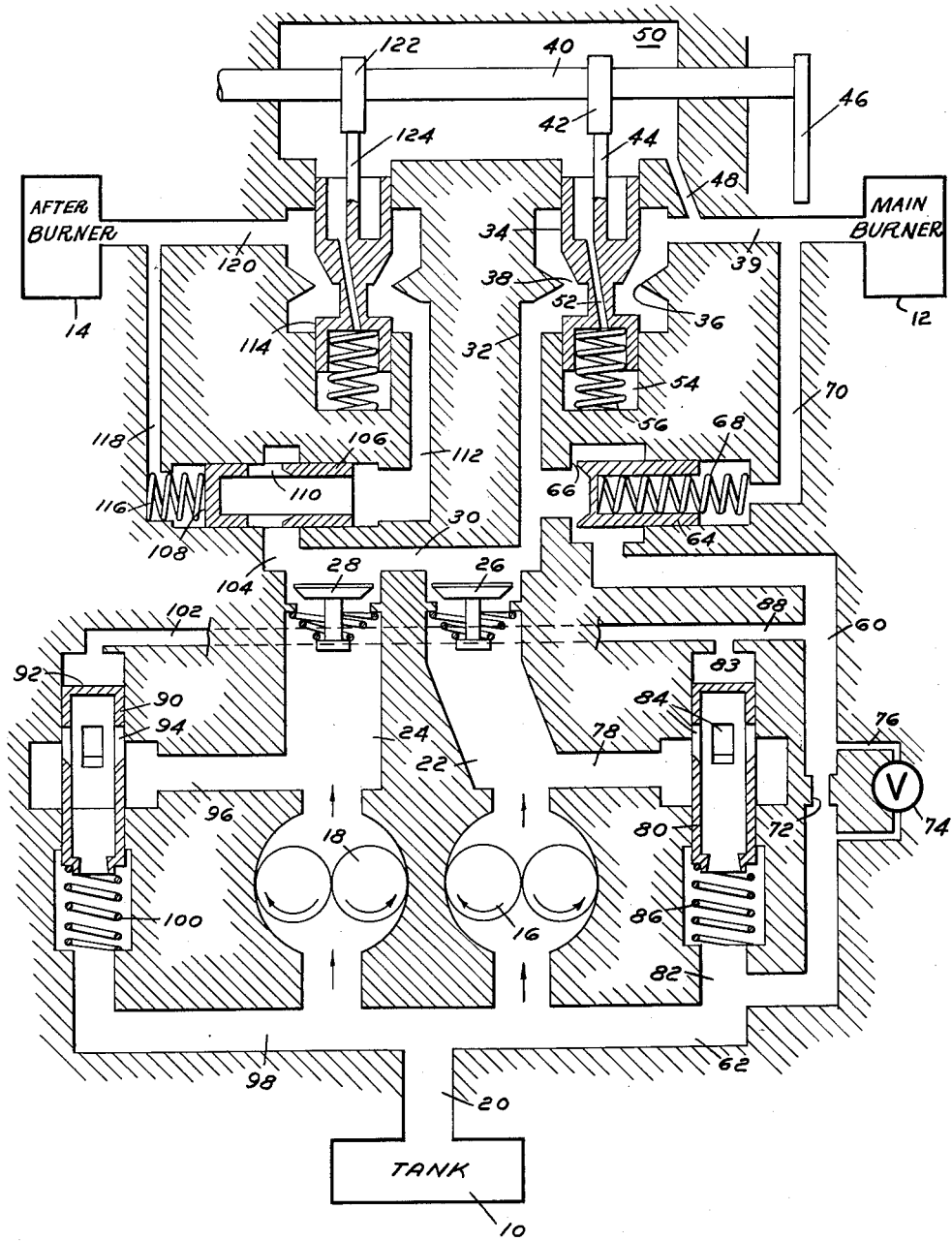
INVENTORS
WARREN H. COWLES
JOHN KARPUS JR.
BY Whittemore,
Hulbert & Belknap
ATTORNEYS

United States Patent Office 3,033,277
Patented May 8, 1962

3,033,277
FUEL SUPPLY SYSTEM
Warren H. Cowles and John Karpus, Jr., Detroit, Mich., assignors to Holley Carburetor Company, Detroit, Mich., a corporation of Michigan
Filed May 9, 1955, Ser. No. 506,924
11 Claims. (Cl. 158—36.4)

The present invention relates to a fuel supply system and more particularly, to a system for supplying fuel to a turbo jet engine.

It is an object of the present invention to provide a fuel supply system for supplying fuel to the primary combustion chamber and selectively to an after burner including separate independent pumps intended primarily for supplying fuel to the primary combustion chamber and the after burner, and in which means are provided for unloading the after burner pump to prevent excessive fuel temperature rise during operation when the main pump supplies the required engine fuel.

It is a further object of the present invention to provide a fuel supply system as described above in which the after burner pump is effective in the event of failure of the main pump to supply primary engine fuel.

It is a further object of the present invention to provide more accurate metering of primary engine fuel.

It is a further object of the present invention to provide a metering valve for metering primary engine fuel in conjunction with fuel bypass means including a primary bypass passage provided with a primary bypass valve and an additional bypass passage having valve means under the control of the primary bypass valve whereby the required range of operation of the primary bypass valve is substantially reduced.

It is a further object of the present invention to provide a system including primary and after burner pumps interconnected to provide for use of any portion of the after burner pump output in conjunction with the main pump output to supply fuel to the main combustion chamber without discontinuity.

It is a further object of the present invention to provide a system as described in the preceding paragraph effective to employ any required portion of the after burner pump output to provide continuous fuel supply without discontinuity, both during engine cranking speed range as well as during partial failure of the main pump.

Other objects and features of the invention will become apparent as the description proceeds, especially when taken in conjunction with the accompanying drawing, wherein the FIGURE is a diagrammatic view of the fuel supply system.

The fuel supply system disclosed in the figure is intended primarily for supplying fuel to the primary combustion chamber and to the after burner of a turbo jet engine. Certain aspects of the invention however are useful in conjunction with other types of engines and the specific description of the invention as applied to a turbo jet engine is not intended to limit the application of the fuel supply system thereto.

A source of fuel such for example as a tank 10 is provided and the fuel supply system is intended to withdraw the required amount of fuel from this tank and to supply it to the main burner of a primary combustion chamber indicated diagrammatically at 12 and to an after burner indicated diagrammatically at 14. The fuel supply system comprises a main pump 16 and an after burner pump 18. These pumps are positive displacement pumps driven directly from the engine and accordingly, they will be driven at a speed dependent upon engine speed. In order to control delivery of fuel to the engine in accordance with demand, means are provided for returning excess fuel output delivered by either or both of the pumps to the tank 10. In the figure, both of the pumps 16 and 18 are shown as connected to the tank 10 by a fuel supply passage 20 including a primary branch 22 in which the main pump 16 is located, and a secondary branch 24 in which the after burner pump 18 is located. The output of the main pump 16 is delivered through a check valve 26 located in the branch passage 22 and the output of the after burner pump 18 is delivered through a check valve 28. While the pump 18 is referred to as an after burner pump, its output may be employed for supplying fuel to the primary combustion chamber 12 and for this purpose a cross connecting passage 30 is provided which permits delivery of fuel from the after burner pump 18 to the primary combustion chamber 12 and also permits delivery of fuel from the main pump 16 to the after burner 14.

The fuel supply system comprises a passage portion 32 leading to a primary metering valve 34 movable with respect to a valve seat indicated at 36 so as to define the orifice 38. Fuel passing through the orifice 38 flows through the portion 39 of the fuel supply passage which connects the metering valve 34 to the primary combustion chamber 12. In actual practice the primary metering valve 34 is positioned as a function of engine rotative speed, engine compressor discharge pressure, engine inlet air temperature, as well as by a fuel selection lever. Inasmuch as the present invention is not concerned with the means for controlling the position of the metering valve in accordance with the variables referred to above, the disclosure is simplified by showing manual means for controlling the position of the metering valve. This means is illustrated as a shaft 40 carrying a cam 42 engaging a cam follower 44 on the primary metering valve 34. The shaft 40 has a power selection lever 46 secured thereto.

A passage 48 extends from the portion 39 of the fuel supply passage to a chamber 50 which is in communication with the upper end of the metering valve 34. A passage 52 extends through the metering valve to permit fuel to enter the chamber 54 and to exert upward fuel pressure on the metering valve. As a result of this the metering valve is subjected to balanced fluid pressure at opposite ends thereof. A compression spring 56 is located in the chamber 54 urging the metering valve upwardly so that its cam follower 44 remains at all times in contact with the positioning cam 42.

A primary bypass passage 60 is provided which extends from the portion 32 of the primary fuel supply passage around the main pump 16 and includes a portion 62 connected to the tank 10 through the fuel supply passage 20. Flow of fluid through the bypass passage 60 is controlled by a primary bypass valve 64 movable toward and away from a valve seat 66. The primary bypass valve 64 has associated therewith a compression spring 68 urging the valve toward closed position. In addition, the valve 64 is subjected to pressure within the portion 39 of the primary fuel supply passage through a passage 70. It will be apparent from an inspection of the figure that the opposite side of the valve 64 is subjected to fluid pressure within the portion 32 of the primary fuel supply passage. Accordingly, the valve 64 is responsive to pressure drop across the metering valve 34 and when this pressure drop is excessive the valve 64 moves toward open position, permitting a flow through bypass passage 60.

In the bypass passage 60 there is provided a restriction 72. A relief valve 74 is preferably provided in parallel with the restriction 72 and connected by a passage 76. This valve 74 is designed to open when pressure drop across the restriction 72 reaches a predetermined value so as to set an upper limit to the pressure drop across the restriction 72.

A main pump bypass passage is provided having a first portion 78 extending to a main pump bypass valve 80 and an additional portion 82 which connects to the tank 10 through passages 62 and 20. The main pump bypass valve 80 is in the form of a cylinder having a closed end 83 and is provided with ports 84 in the sides thereof through which fuel may flow for return to the tank 10. The valve 80 is biased toward closed position by a compression spring 86 and is regulated by pressure applied to the closed end 83 thereof through a passage 88 connecting to the primary bypass passage 60. The valve 80 is accordingly regulated by pressure existing within the primary bypass passage 60 or by the pressure drop existing across the restriction 72.

When the output of the after burner pump 18 is not required to supply fuel, the valve 90 is unloaded so as to minimize the energy transmitted to the fuel and hence to reduce any fuel temperature rise. This is accomplished by providing an after burner pump unloading valve 90 in the form of a cylinder having a closed end 92 and having ports 94 in the side wall thereof through which fluid may be bypassed around the after burner pump 18 through the bypass passage including the portion 96 leading to the valve 90 and the portion 98 connecting through passage 20 to the tank 10. The unloading valve 90 is biased toward closed position by a compression spring 100. Pressure existing within the primary bypass passage 60 is operative on the closed end 92 of the valve 90 through an extension 102 of the passage 88. As a result of this, a large pressure drop across the restriction 72 in the primary bypass passage, or an increase in pressure in the portion of the bypass passage 60 anterior to the restriction 72 is effective to urge both the unloading valve 90 and the main pump bypass valve 80 toward open position. The effectiveness of the springs 100 and 86 is so related that unloading valve 90 is moved to fully open position before the main pump bypass valve 80 starts to open. This provides for completely unloading the after burner pump when its output is not required before regulation of the output of the main pump 16 is commenced. The check valves 26 and 28 prevent the output of either of the pumps from being reversed through the branch of the fuel supply passage containing the other pump. Thus, when all fuel is being supplied by the main pump 16, check valve 28 is closed. By the same token, in the event of failure of the main pump 16, the output of the after burner pump 18 is affected to close the check valve 26 so that all fuel supplied by the after burner pump will be available.

The after burner fuel supply passage includes a portion 104 extending from the cross connecting passage 30 to an after burner throttling valve 106 which has the function of reducing the pressure of fuel supplied to the after burner to a pressure below that of the fuel supplied to the primary combustion chamber. The throttle regulating valve 106 is in the form of a cylinder having a closed end wall 108 and provided with ports 110 located in its side wall through which the throttled fuel flows to the portion 112 of the after burner fuel supply passage which leads to the after burner metering valve 114. Resilient means 116 are provided biasing the throttling valve 106 toward open position. A passage 118 is provided connected to the portion 120 of the after burner fuel supply passage extending from the metering valve 114 to the after burner 14. Thus, the closed end 108 of the throttling valve is subjected at one side to the action of the spring 116 and to the pressure within the portion 120 of the after burner fuel supply passage, and at the other side by the pressure existing within the portion 112 of the after burner fuel supply passage. Accordingly, the throttle valve is positioned to maintain the required pressure differential between portions 112 and 120 of the after burner fuel supply passage.

The after burner metering valve 114 is similar in construction to the primary meter valve 34 and is subjected to balanced pressures as described in conjunction with the primary metering valve 34. Again, the means for controlling the position of the after burner metering valve is illustrated diagrammatically as a cam 122 on the shaft 40 and a cam follower 124 on the metering valve 114. It will of course be understood that this is purely diagrammatic and that in practice the actual positioning of the after burner valve may be by means responsive to a plurality of variable conditions.

Assuming that the main pump 16 has ample capacity to supply engine requirements, the after burner pump 18 is unloaded through the operation of the check valve 28 and the after burner pump unloading valve 90. The pump unloading valve 90 is opened in response to an increase in pressure drop across the restriction 72 in the primary bypass passage 60. This pressure drop is established by the amount of fuel bypassed by the primary bypass valve 64. If none of the output of the after burner pump 18 is required for engine operation, the valve 90 is completely opened against the action of the spring 100 by pressure existing within passages 88 and 102 and the check valve 28 closes so that the output of the main pump 16 will not be recirculated through check valve 28. This operation unloads the after burner pump 18 so that a minimum of energy is transmitted to the fuel to cause any fuel temperature rise therein.

The final metering of the main engine fuel is accomplished by positioning the main metering valve 34 so that the orifice 38 passes the required amount of primary combustion fuel. It is again emphasized that in the diagrammatic drawing the means for positioning the primary metering valve 34 is illustrated as manual but that this is solely for the purpose of simplification. In the actual application the means for positioning the primary metering valve includes means responsive to a number of variable conditions.

The pressure drop across the orifice 38 is held substantially constant by the primary bypass valve 64 and spring 68 in such a way that if the pressure drop between portions 32 and 39 of the primary fuel supply passage increases the valve 64 opens against the spring 68. This causes a greater amount of fuel to bypass through bypass passage 60, restriction 72, and passage 62 to the tank. The increased pressure drop on the restriction 72 causes main pump bypass valve 80 to open further.

An important and valuable feature of the present invention is in the relationship between valves 64 and 80. The regulation of the valve 64, which tends to directly control pressure drop across the primary metering valve 34, is improved because its range of operation is minimized to a great degree by the addition of the bypass system including the main pump bypass valve 80. Main pump bypass valve 80 tends to hold the pressure drop across the restriction 72 approximately constant by sensing these pressures on opposite ends of the closed end portion 82 and by opposing the higher pressure by the spring 86. The valve 80 is spring loaded toward closed position so that when the pressure drop across the restriction 72 exceeds the loading of the spring 86, the valve 80 moves toward open position and bypasses the excess output of the main pump 16.

The operation of the valve 90 in conjunction with the restriction 72 is very similar to the operation of the valve 80 in conjunction with the restriction 72. As previously described, the spring 100 is selected to permit full opening of the after burner pump unloading valve 90 prior to initiation of opening of the main pump bypass valve 80. Depending upon engine speed and engine demand or requirements, the valves 80 and 90 function to maintain an approximately constant flow through the restriction 72. The same flow of fuel passing the restriction 72 will of course first pass the valve 64, so that the operation of the valve 64 is reduced to a relatively small range of flow. In this sense the function of the primary bypass valve 64 may be considered as controlling the position of the valves 90 and 80.

The after burner fuel is maintained through the after burner metering valve 114 and the throttling valve 106. The throttling valve is used at this point because the pressure in the after burner line 120 is always lower than the pressure in the portion 39 of the primary fuel supply passage. Throttling is therefore required to prevent all of the flow from seeking the lower pressure in the passage 120 and thus starving the main engine. The after burner metering valve 114, as shown in the figure, is again simplified from the one in actual use, in that in actual use the after burner metering valve is positioned as a function of engine compressor discharge pressure as well as power lever selection. The throttling valve operates in such a way that the pressure upstream of the metering orifice of the valve is referenced to one side of the throttling valve 106, while the pressure at the downstream side of the after burner metering valve is referenced to the spring side of the throttling valve through the passage 118. The valve 106 is spring loaded open, which allows fuel to flow to the after burner until the pressure drop across the orifice provided by the after burner metering valve 114 exceeds the loading of the spring 116 on the throttling valve 106. At this time the valve 106 moves to the closed position and throttles or restricts additional flow of fuel to the after burner. The opposite is true when too little fuel is flowing to the after burner.

It will thus be seen that the present system provides a definite inter-action and cooperation between portions of the fuel supply system intended primarily for supplying fuel to the primary combustion chamber and the after burner. At the same time, the arrangement is such that continuity of fuel supply is maintained so long as either the main pump or the after burner pump is in operation.

It will be apparent that the bypass passages controlled by the valves 64 and 80 are effective to exert a control on the output of the pumps in reference to engine demand or requirements so that in the first place the after burner pump is completely unloaded so long as the capacity of the main pump is sufficient to satisfy the demand. Moreover, while the main pump is supplying the entire engine demand, its excess output is bypassed and returned to the tank through bypass means including a control valve regulated in accordance with engine demand.

The drawing and the foregoing specification constitute a description of the improved fuel supply system in such full, clear, concise and exact terms as to enable any person skilled in the art to practice the invention, the scope of which is indicated by the appended claims.

What we claim as our invention is:

1. A fuel supply system comprising a tank, a main fuel supply passage extending from said tank to a fuel combustion chamber, a main pump in said passage, a main pump bypass passage connected to said main fuel supply passage around said pump, a main pump bypass valve in said main pump bypass passage, a primary metering valve in said main fuel supply passage between said main pump and said chamber, a primary bypass passage connected in parallel with said main pump bypass passage to said main fuel passage, a restriction in said primary bypass passage, a primary bypass valve in said primary bypass passage responsive to pressure differential at opposite sides of said primary metering valve to open upon an increase in said pressure differential to maintain said pressure differential substantially constant, and means responsive to a second pressure differential at opposite sides of said restriction for actuating said main pump bypass valve to open said main pump bypass valve upon an increase in said second pressure differential, a secondary fuel supply passage extending from said tank to a fuel combustion chamber, a secondary pump in said passage, a secondary pump bypass passage connected to said secondary fuel supply passage around said secondary pump, an unloading valve in said secondary pump bypass passage, a secondary metering valve in said secondary fuel supply passage between said secondary pump and said last named chamber, a cross connecting passage between said main and secondary fuel supply passages connected to each between the pump and metering valve therein, and means responsive to said second pressure differential for actuating said unloading valve to open said unloading valve upon an increase in said second pressure differential.

2. A system as defined in claim 1 in which said fuel supply passages each has a check valve therein between the pump and the cross connecting passage.

3. A system as defined in claim 1 which comprises a throttling valve in said secondary fuel supply passage between said cross connecting passage and said secondary metering valve.

4. A fuel supply system comprising a tank, a fuel supply passage extending from said tank to a fuel combustion chamber and including a pair of branches in parallel each containing a pump, a separate branch bypass passage having a bypass valve therein and connected to each of said branches around the pump therein, a metering valve in said fuel supply passage, means responsive to pressure drop across said metering valve to control the valves in said bypass passages, said means comprising a third bypass passage connected to said fuel supply passage around the branches thereof, a valve responsive to pressure difference across said metering valve controlling flow through said third bypass passage, a restriction in said third bypass passage, means responsive to pressure drop across said restriction operable to apply valve opening forces to the valves in said branch bypass passages, and resilient means biasing the valves in said branch bypass passages toward closed position.

5. A fuel supply system comprising a tank, a fuel supply passage extending from said tank to a fuel combustion chamber and including a pair of branches in parallel each containing a pump, a separate branch bypass passage having a bypass valve therein and connected to each of said branches around the pump therein, a metering valve in said fuel supply passage, means responsive to pressure drop across said metering valve to control the flow in said bypass passages, said means comprising a third bypass passage connected to said fuel supply passage around the branches thereof, a valve responsive to pressure difference across said metering valve controlling flow through said third bypass passage, a restriction in said third bypass passage, means responsive to pressure drop across said restriction operable to apply valve opening forces to the valves in said branch bypass passages, and resilient means connected to the valves in said branch passages and biasing said valves toward closed position, the strength of said resilient means being such as to provide for substantially full opening of one of said bypass valves before the other starts to open.

6. A fuel supply system comprising a tank, a fuel supply passage extending from said tank to a fuel combustion chamber and including a pair of branches in parallel each containing a pump, a separate branch bypass passage having a bypass valve therein connected to each of said branches around the pump therein, a metering valve in said fuel supply passage, means responsive to pressure drop across said metering valve to control the valves in said bypass passages, said means comprising a third bypass passage connected to said fuel supply passage around the branches thereof, a valve responsive to pressure difference across said metering valve controlling flow through said third bypass passage to increase flow upon an increase in said pressure difference, a restriction in said third bypass passage, means responsive to pressure drop across said restriction operable to apply valve opening forces to the valves in said branch bypass passages, resilient means biasing the valves in said branch bypass passages toward closed position, and a check valve in each branch.

7. A fuel supply system comprising a fuel source, a fuel supply passage having a first and second branch in parallel and connected to a single fuel outlet passage, a separate pump in each of said branches, a check valve in each of said branches, first and second bypass passages extending respectively from said first and second branches between the pumps and check valves therein to said source, first and second bypass valves located respectively in said first and second bypass passages, a metering valve in said fuel outlet passage, a third bypass passage extending from said fuel outlet passage between said metering valve and the connection with said branch passages to said source, a third bypass valve in said third bypass passage responsive to pressure drop across said metering valve to move toward open position upon an increase in said pressure drop, and means directly responsive to the quantity of fuel flowing in said third bypass passage to apply increasing valve opening forces to both said first and second bypass valves upon increase in the quantity of fuel flowing in said third bypass passage.

8. A fuel supply system comprising a fuel source, a fuel supply passage having a first and second branch in parallel and connected to a single fuel outlet passage, a separate pump in each of said branches, a check valve in each of said branches, first and second bypass passages extending respectively from said first and second branches between the pumps and check valves therein to said source, first and second bypass valves located respectively in said first and second bypass passages, a metering valve in said fuel outlet passage, a third bypass passage extending from said fuel outlet passage between said metering valve and the connection with said branch passages to said source, a third bypass valve in said third bypass passage responsive to pressure drop across said metering valve to move toward open position upon an increase in said pressure drop, means directly responsive to the quantity of fuel flowing in said third bypass passage to apply increasing valve opening forces to both said first and second bypass valves upon increase in the quantity of fuel flowing in said third bypass passage, and resilient means connected to each of said first and second bypass valves and biasing said valves toward closed positions, the strength of one of said resilient means being such as to maintain its associated bypass valve substantially closed until the other is substantially fully open.

9. A fuel supply system comprising a fuel source, a fuel supply passage having a first and second branch in parallel and connected to a single fuel outlet passage, a separate pump in each of said branches, a check valve in each of said branches, first and second bypass passages extending respectively from said first and second branches between the pumps and check valves therein to said source, first and second bypass valves located respectively in said first and second bypass passages, a metering valve in said fuel outlet passage, a third bypass passage extending from said fuel outlet passage between said metering valve and the connection with said branch passages to said source, a third bypass valve in said third bypass passage responsive to pressure drop across said metering valve to move toward open position upon an increase in said pressure drop, a restriction in said third bypass passage, and means responsive to the pressure drop across said restriction to apply increasing valve opening forces to said first and second bypass valves upon an increase in the pressure drop across said restriction.

10. A fuel supply system comprising a fuel source, a fuel supply passage having a first and second branch in parallel and connected to a single fuel outlet passage, a separate pump in each of said branches, a check valve in each of said branches, first and second bypass passages extending respectively from said first and second branches between the pumps and check valves therein to said source, first and second bypass valves located respectively in said first and second bypass passages, a metering valve in said fuel outlet passage, a third bypass passage extending from said fuel outlet passage between said metering valve and the connection with said branch passages to said source, a third bypass valve in said third bypass passage responsive to pressure drop across said metering valve to move toward open position upon an increase in said pressure drop, a restriction in said third bypass passage, means responsive to the pressure drop across said restriction to apply increasing valve opening forces to said first and second bypass valves upon an increase in the pressure drop across said restriction, and resilient means connected to each of said first and second bypass valves to bias them toward closed positions, the strength of one of said resilient means being such as to maintain its associated bypass valve substantially closed until the other is substantially fully open.

11. A fuel supply system comprising a source of fuel, a burner, a main passage connecting said source and burner, a first pump in said passage, a metering valve in said passage between said pump and burner, a primary bypass passage connected to said main passage between said pump and metering valve, a pressure regulating valve in said primary bypass passage, pressure responsive control means for said pressure regulating valve connected to opposite sides of said metering valve to maintain a constant pressure drop across said metering valve, a main pump bypass passage connected to said main passage between said pump and metering valve, a main pump bypass valve in said main pump bypass passage, actuating means for said main pump bypass valve responsive to bypass flow of fuel in said primary bypass passage and operable under normal conditions to bypass a substantial quantity of fuel to reduce the required range of said pressure regulating valve, a second passage connected between said source of fuel and said burner in parallel to said main passage, a second pump in said second passage, an unloading passage extending from said second passage beyond said second pump to said source, an unloading valve in said unloading passage, actuating means for said unloading valve responsive to fuel flow in said primary bypass passage and calibrated with reference to said main pump bypass valve actuating means to start to close said unloading valve only after substantially full closure of said main pump bypass valve.

References Cited in the file of this patent

UNITED STATES PATENTS

| | | |
|---|---|---|
| 2,437,480 | Pugh et al. | Mar. 8, 1948 |
| 2,545,856 | Orr | Mar. 20, 1951 |
| 2,595,618 | Vogt et al. | May 6, 1952 |
| 2,601,849 | Lee | July 1, 1952 |
| 2,617,361 | Neal | Nov. 11, 1952 |
| 2,638,739 | Barr | May 19, 1953 |
| 2,649,906 | Neal et al. | Aug. 25, 1953 |
| 2,707,021 | Harris | Apr. 26, 1955 |
| 2,738,003 | Carey | Mar. 13, 1956 |
| 2,765,800 | Drake | Oct. 9, 1956 |
| 2,835,323 | Booth | May 20, 1958 |

FOREIGN PATENTS

| | | |
|---|---|---|
| 753,831 | Germany | Aug. 23, 1954 |